United States Patent [19]
Tamai et al.

[11] Patent Number: 5,268,446
[45] Date of Patent: Dec. 7, 1993

[54] READILY PROCESSABLE POLYIMIDE AND PREPARATION PROCESS OF SAME

[75] Inventors: Shoji Tamai, Kanagawa; Masahiro Ohta, Fukuoka; Akihiro Yamaguchi, Kanagawa, all of Japan

[73] Assignee: Mitsui Toatsu Chemicals, Incorporated, Tokyo, Japan

[21] Appl. No.: 743,105

[22] Filed: Aug. 9, 1991

[30] Foreign Application Priority Data

Aug. 24, 1990 [JP] Japan ............................. 2-221057

[51] Int. Cl.⁵ ............................................. C08G 69/26
[52] U.S. Cl. ........................................ 528/353; 528/125; 528/126; 528/128; 528/170; 528/171; 528/172; 528/173; 528/179; 528/187; 528/188; 528/229; 528/351
[58] Field of Search ............... 528/125, 126, 128, 172, 528/179, 187, 188, 229, 353, 170, 171, 173, 351

[56] References Cited

U.S. PATENT DOCUMENTS 3,959,350  5/1976  Rogers ................................ 528/185
3,998,786  12/1976  D'Alelio ............................ 528/125
4,876,330  10/1989  Higashi et al. ................... 528/353
4,994,544  2/1991  Nagahiro et al. .................. 528/125

FOREIGN PATENT DOCUMENTS 276922  8/1988  European Pat. Off. .
323912  7/1989  European Pat. Off. .
350203  1/1990  European Pat. Off. .
1-96221  4/1989  Japan .

OTHER PUBLICATIONS

Patent Abstracts of Japan, vol. 13, No. 595 (C-672), Dec. 27, 1989 and JP-A-01 252 634, Oct. 9, 1989.

*Primary Examiner*—John Kight, III
*Assistant Examiner*—Shelley A. Dodson
*Attorney, Agent, or Firm*—Burns, Doane, Swecker & Mathis

[57] ABSTRACT

A readily melt-processable polyimide obtained by reacting diamino-diphenyl ether with 3,3',4,4'-biphenyltetracarboxylic dianhydride in the presence of phthalic anhydride and thermally or chemically imidizing the resultant polyamic acid.

5 Claims, 4 Drawing Sheets

READILY PROCESSABLE POLYIMIDE AND PREPARATION PROCESS OF SAME

BACKGROUND OF THE INVENTION

1. Field of the Invention

The present invention relates to a polyimide used for melt processing and more particularly relates to a polyimide having excellent processability and to a process for preparing the same.

2. Description of the Related Art

Polyimide obtained by reacting tetracarboxylic acid dianhydride with diamine has very high heat resistance and is additionally excellent in mechanical strength, dimensional stability, flame retardance and electrical insulation. Because of these preferred properties, polyimide has been conventionally used in various fields such as electric and electronic appliances, space and aeronautical equipment and transportation machinery. Thus, polyimide is a functional resin which is expected to be more widely used for fields where heat resistance is required. In view of the expanded fields of use, the required performance and application methods have been diversified and various polyimide resins having excellent properties to meet these requirements have been developed.

Some of these polyimide resins, however, have no distinct glass transition temperature, though excellent in heat resistance, and must be processed by such means as sinter molding in the case of using these resins as molding materials. Other kinds of polyimide are soluble in solvents such as halogenated hydrocarbons and have disadvantage in solvent resistance, though excellent in processability. Thus previously- developed polyimides have both merits and drawbacks in the properties.

SUMMARY OF THE INVENTION

An object of the present invention is to provide a polyimide which is excellent in processability and has good chemical resistance and outstanding transparency in addition to excellent heat resistance.

The present inventors have completed the present invention as a result of an intensive research in order to accomplish the object.

One aspect of the present invention is a readily processable polyimide having a polymer chain being blocked at the end with a divalent aromatic radical derived from phthalic anhydride an essentially consisting of recurring structural units represented by the formula (I):

Another aspect of the invention is a process for preparing the polyimide by reacting diamine with tetracarboxylic acid dianhydride and chemically or thermally imidizing the resultant polyamic acid, comprising that:

(1) the diamine is a diaminodiphenyl ether represented by the formula (II):

(2) the tetracarboxylic acid dianhydride is 3,3',4,4'-biphenyltetracarboxylic dianhydride having the formula (III):

(3) the reaction is carried out in the presence of phthalic anhydride having the formula (IV):

and the phthalic anhydride of the formula (IV) is reacted in an amount of from 0.001 to 1.0 mole per mole of the diaminodiphenyl ether of the formula (II).

The polyamide of the invention is characterized by using 3,3',4,4'-biphenyltetracarboxylic dianhydride as a tetracarboxylic acid dianhydride component, and has excellent processability and chemical resistance in addition to essential heat resistance.

On the other hand, in the case of reacting 4,4'-diaminodiphenyl ether with tetracarboxylic acid dianhydride having the formula (III):

that is, pyromellitic dianhydride in place of 3,3',4,4'-biphenyltetracarboxylic dianhydride, the resulting polyimide has recurring structural units of the formula (V):

the polyimide thus obtained has no distinct glass transition temperature and is difficult to process as a molding material, though excellent in heat resistance. It is widely known that the polyimide must be processed by using a such as sinter molding.

The polyimide of the present invention is thermoplastic while maintaining excellent heat resistance and has excellent processability. That is, the polyimide of the invention is a highly heat-resistant and melt-processable polyimide.

In view of excellent chemical resistance in combination with the above outstanding processability, the polyimide of the invention is very useful as a base material for space- and air-crafts and a base material for electric and electronic appliances.

The polyimide of the invention has excellent melt-flow stability and remarkably improved processability as compared with conventional polyimide.

DETAILED DESCRIPTION OF THE INVENTION

The polyimide of the invention is a polyimide blocked at the end of polymer chain with a divalent aromatic radical derived from phthalic anhydride having the formula (IV):

(IV)

and essentially composed of recurring structural units represented by the formula (I):

(I)

The polyamide of the invention can be prepared by reacting a diaminodiphenol ether represented by the formula (II):

(II)

with 3,3',4,4'-biphenyltetracarboxylic dianhydride having the formula (III):

(III)

in the presence of phthalic anhydride having the formula (IV)

(IV)

and the thermally or chemically imidizing the resultant polyamic acid blocked at the end of polymer chain with a divalent radical derived from phthalic anhydride.

Exemplary diaminodiphenyl ethers which can be used in the process include
4,4'-diaminodiphenyl ether,
3,3'-diaminodiphenyl ether,
2,2'-diaminodiphenyl ether,
2,3'-diaminodiphenyl ether,
2,4'-diaminodiphenyl ether and
3,4'-diaminodiphenyl ether.

These diaminodiphenyl ethers can be used singly or as a mixture. The polyimide of the invention is prepared by using these diaminodiphenyl ethers as diamine components. However, other diamines can also be used as a mixture as long as imparting no adverse effect on the good properties of the polyimide.

Other diamines which can be used in combination with diaminodiphenyl ether include, for example,
m-phenylenediamine
o-phenylenediamine
p-phenylenediamine
m-aminobenzylamine
p-aminobenzylamine
bis(3-aminophenyl) sulfide,
(3-aminophenyl)(4-aminophenyl) sulfide,
bis(4-aminophenyl) sulfide,
bis(3 aminophenyl) sulfoxide,
(3-aminophenyl)(4-aminophenyl) sulfoxide,
bis(4-aminophenyl) sulfoxide,
bis(3-aminophenyl) sulfone,
(3-aminophenyl)(4-aminophenyl) sulfone,
bis(4-aminophenyl) sulfone,
3,3'-diaminobenzophenone,
3,4'-diaminobenzophenone,
4,4'-diaminobenzophenone,
3,3'-diaminodiphenylmethane,
3,4'-diaminodiphenylmethane,
4,4'-diaminodiphenylmethane,
bis [4-(3-aminophenoxy)phenyl]methane,
bis [4-(4-aminophenoxy)phenyl]methane,
1,1-bis [4-(3-aminophenoxy)phenyl]ethane,
1,1-bis [4-(4-aminophenoxy)phenyl]ethane,
2-bis [4-(3-aminophenoxy)phenyl]ethane,
1,2-bis [4-(4-aminophenoxy)phenyl]ethane,
2,2-bis [4-(3-aminophenoxy)phenyl]propane,
2,2-bis [4-(4-aminophenoxy)phenyl]propane,
2,2 bis [4 (3-aminophenoxy)phenyl]butane, 2,2-bis [4-(4-aminophenoxy)phenyl]butane,
2,2-bis [4-(3-aminophenoxy)phenyl]-1,1,1,3,3,3-hexafluoropropane,
2,2-bis [4 (4-aminophenoxy)phenyl]-1,1,1,3,3,3-hexafluoropropane,
1,3-bis(3-aminophenoxy)benzene,
1,3-bis(4-aminophenoxy)benzene,
1,4-bis(3-aminophenoxy)benzene,
1,4-bis(4-aminophenoxy)benzene,
4,4'-bis(3-aminophenoxy)biphenyl,
4,4'-bis(4-aminophenoxy)biphenyl,
bis [4-(3-aminophenoxy)phenyl]ketone,
bis [4-(4-aminophenoxy)phenyl]ketone,
bis [4-(3-aminophenoxy)phenyl]1 sulfide,
bis [4-(4-aminophenoxy)phenyl]1 sulfide,
bis [4-(3-aminophenoxy)phenyl]sulfoxide,
bis [4-(4-aminophenoxy)phenyl]sulfoxide,
bis [4-(3-aminophenoxy)phenyl]sulfone,
bis [4-(4-aminophenoxy)phenyl]sulfone,
bis [4-(3-aminophenoxy)phenyl]ether,
bis [4-(4-aminophenoxy)phenyl]ether,
4-bis [4-(3-aminophenoxy)benzoyl]benzene,
1,3-bis [4-(3-aminophenoxy)benzoyl]benzene,
4,4'-bis [3-(4-aminophenoxy)benzoyl]diphenyl ether,
4,4'-bis [3-(3-aminophenoxy)benzoyl]diphenyl ether,
4,4'-bis [4-(4-amino-α,α-dimethylbenzyl)phenoxy]benzophenone,
4,4'-bis [4-(4-amino-α,α-dimethylbenzyl)phenoxy]diphenyl sulfone,
bis [4- {4-(4-aminophenoxy)phenoxy}phenyl]sulfone,
1,4-bis [4-(4-aminophenoxy)-α,α-dimethylbenzyl]benzene, and
1,3-bis [4-(4-aminophenoxy)-α,α-dimethylbenzyl]benzene.

These diamines are used singly or as a mixture.

A portion of phthalic anhydride having the formula (IV) which is used in the invention can be replaced by other dicarboxylic acid anhydrides as long as imparting no adverse effect on the good properties of polyimide.

Other dicarboxylic acid anhydrides which can be used include, for example,
2,3-benzophenonedicarboxylic anhydride,
3,4-benzophenonedicarboxylic anhydride,
2,3-dicarboxyphenyl phenyl ether anhydride,
3,4-dicarboxyphenyl phenyl ether anhydride,
2,3 biphenyldicarboxylic anhydride,
3,4-biphenyldicarboxylic anhydride,
2,3-dicarboxyphenyl phenyl sulfone anhydride,
3,4-dicarboxyphenyl phenyl sulfone anhydride,
2,3-dicarboxyphenyl phenyl sulfide anhydride,
3,4-dicarboxyphenyl phenyl sulfide anhydride,
1,2-naphthalenedicarboxylic anhydride,
2,3-naphthalenedicarboxylic anhydride,
1,8-naphthalenedicarboxylic anhydride,
1,2-anthracenedicarboxylic anhydride,
2,3-anthracenedicarboxylic anhydride and
1,9-anthracenedicarboxylic anhydride.

The amount of phthalic anhydride used in the invention is from 0.001 to 1.0 mole per mole of diaminodiphenyl ether having the formula (II). An amount less than 0.001 mole leads to viscosity increase in processing at high temperature and causes deterioration of processability. An amount exceeding 1.0 mole results in reduction of mechanical properties. Preferred amounts range from 0.01 to 0.5 mole.

The preparation process of the polyimide in the invention is preferably carried out in organic solvents. Useful solvents include, for example, N,N-dimethylformamide N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-bis(2 methoxyethoxy)ethane, bis [2-(2-methoxyethoxy)ethyl]ether, tetrahydrofuran, 1,3-dioxane, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol and anisole. These organic solvents can be used singly or as a mixture.

In the process of the invention, diaminodiphenyl ethers, 3,3',4,4'-biphenyltetracarboxylic dianhydride and phthalic anhydride are added to the solvent and reacted by the following procedures:

(1) 3,3',4,4'-Biphenyltetracarboxylic dianhydride and diaminodiphenyl ether are reacted and thereafter phthalic anhydride is added to continue the reaction.

(2) Diaminodiphenyl ether in reacted with phthalic anhydride and successively 3,3',4,4'-biphenyltetracarboxylic dianhydride is added to continue the reaction.

(3) 3,3',4,4'-Biphenyltetracarboxylic dianhydride, diaminodiphenyl ether and phthalic anhydride are added at the same time to carry out the reaction. Any of the above addition procedures can be conducted.

The reaction temperature is usually 250° C. or less, preferably 50° C. or less.

No particular restriction is imposed upon the reaction pressure. Atmospheric pressure is sufficient to carryout the reaction.

The reaction time differs depending upon the kinds of diaminodiphenyl ether and solvent and the reaction temperature. Sufficient reaction time is usually from 4 to 24 hours.

The resulting polyamic acid is imidized by further heating at 100° to 400° C. or chemically imidized by using an imidizing agent such as acetic anhydride to obtain polyimide having recurring structural units corresponding to the polyamic acid.

The polyimide can also be prepared by suspending or dissolving 3,3',4,4'-biphenyltetracarboxylic dianhydride, diaminodiphenyl ether and phthalic anhydride in the organic solvent and by successively heating to carry out formation of polyamic acid precursor and imidization at the same time.

That is, film or powder of the polyimide can be obtained by using conventional procedures.

In the melt processing of polyimide of the invention, suitable amounts of other thermoplastic resins can also be blended depending upon the object for use unless impairing the object of the invention. Other thermoplastic resins which can be blended include, for example, polyethylene, polypropylene, polycarbonate, polyarylate, polyamide, polysulfone, polyether sulfone, polyether ketone, polyether ether ketone, polyphenylene sulfide, polyamideimide, polyetherimide and modified polyphenylene oxide.

Fillers which are commonly used for thermoplastic resin compositions can also be used as long as imparting no adverse effect on the object of the invention. Exemplary fillers include, graphite, carborundum, silica powder, molybdenum disulfide, fluoro resin and other abrasion resistance improvers; glass fibers, carbon fibers, boron fibers, silicon carbide based fibers, carbon whiskers, asbestos, metallic fibers, ceramic fibers and other reinforcements; antimony trioxide, magnesium carbonate, calcium carbonate and other flame retardants; clay, mica and other electrical property improvers; asbestos, silica, graphite and other tracking resistance improvers;

barium sulfate, silica calcium metasilicate and other acid resistance improvers; iron powder zinc powder, aluminum powder, copper powder and other thermal conductivity improvers; and other miscellaneous materials such as glass beads, glass spheres, talc, diatomaceous earth, alumina, silicate balloons, hydrated alumina, metal oxides and coloring materials.

The present invention will hereinafter be illustrated further in detail by way of examples and comparative examples.

Physical properties in the examples and comparative examples were measured by the following method.

Tg, Tc, Tm: Measured by DSC(Shimadzu DT-40, Series DSC-41M)

5% Weight loss temperature: Measured by DTG(Shimadzu DT-40, Series DSC-40M) in the air Melt viscosity: Measured with Shimazu-Koka Type Flow Tester CFT 500A under 100 kg load

EXAMPLE 1

To a reaction vessel equipped with a stirrer, reflux condenser, water separator and nitrogen inlet tube, 120.0 g (0.6 mole) of 3,4'-diaminodiphenyl ether, 169.3 g (0.576 mole) of 3,3',4,4'-biphenyltetracarboxylic dianhydride, 7.10 g (0.048 mole) of phthalic anhydride, 8.4 g of γ-picoline and 1200 g of m-cresol were charged. The mixture was heated to 145° C. with stirring in a nitrogen atmosphere while distilling out about 20 cc of water and further reacted for 4 hours at 140° to 150° C. The reaction mixture was cooled to room temperature and poured into about 10 l of methyl ethyl ketone. Precipitated polyimide powder was filtered, washed with methyl ethyl ketone and dried at 180° C. for 24 hours under reduced pressure to obtain 271.0 g (98.6% yield) of polyimide powder having an inherent viscosity of 0.60 dl/g.

The inherent viscosity was measured at 35° C. in a solution obtained by heat-dissolving 0 50 g of the polyimide powder in 100 ml of a solvent mixture of p-chlorophenol/phenol (9/1 by weight). The polyimide powder had a glass transition temperature (Tg) of 247° C., crystallization temperature (Tc) of 275° C., crystal melting temperature of 401° C. and 5% weight loss temperature of 557° C. in air.

Figure 1:
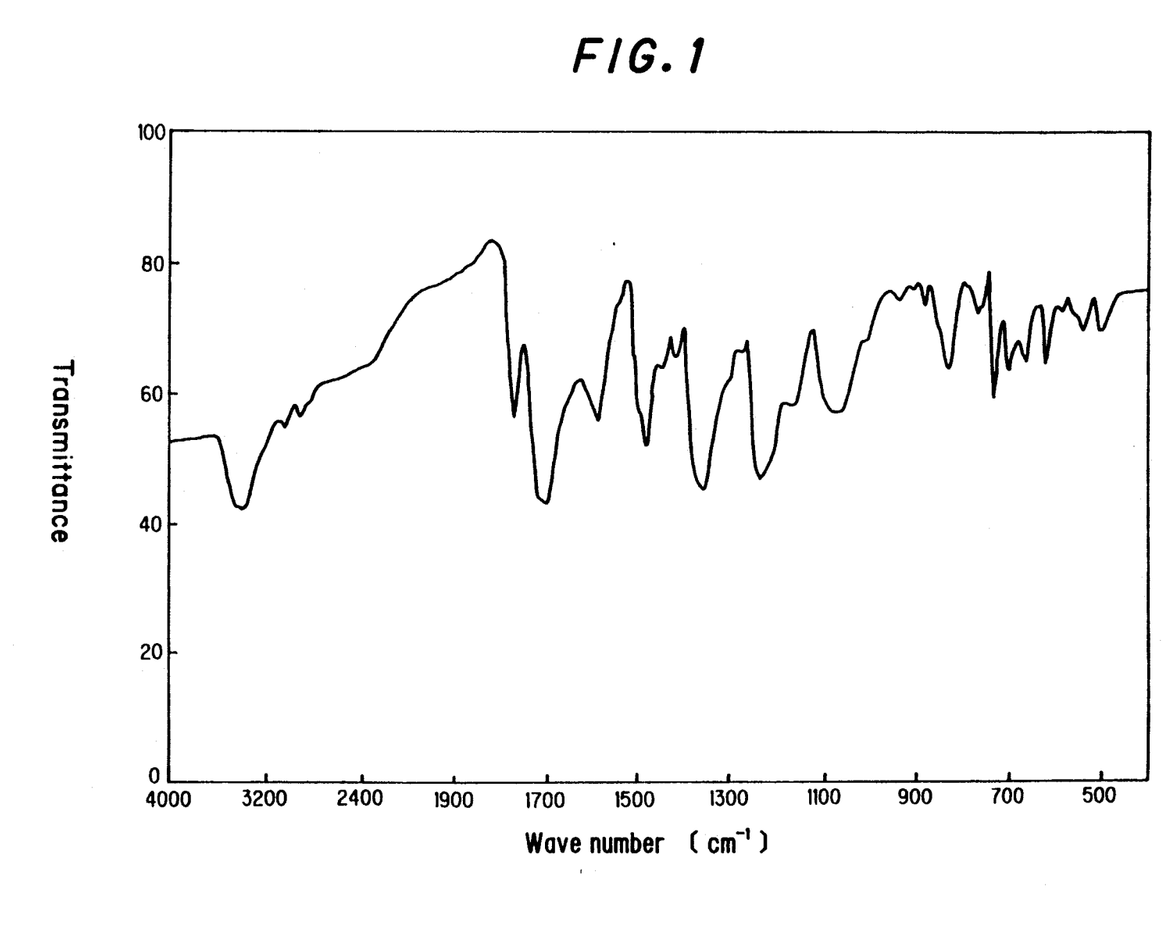
FIG. 1 illustrates a drawing of infrared absorption spectrum of polyimide powder obtained in Example 1.

The IR absorption spectrum of the polyimide powder is illustrated in FIG. 1. In the spectrum, characteristic absorption bands of imide near 1780 cm$^{-1}$ and 1720 cm$^{-1}$, and a characteristic absorption band of ether linkage near 1240 cm$^{-1}$ were clearly found.

The following results were obtained in elemental analysis of the polyimide powder thus obtained.

| | Elemental analysis | | |
|---|---|---|---|
| | C | N | H |
| Calculated (%) | 73.35 | 6.11 | 3.07 |
| Found (%) | 73.31 | 6.13 | 3.01 |

The polyimide powder was insoluble in halogenated hydrocarbon solvents such as methylene chloride and chloroform.

The melt viscosity of the polyimide powder thus obtained was measured with a Koka type flow tester under 100 kg load by using an orifice having a diameter of 0.1 cm and a length of 1 cm. The melt viscosity was 8100 poise at 420° C. The strand obtained was light yellow and flexible.

Figure 2:
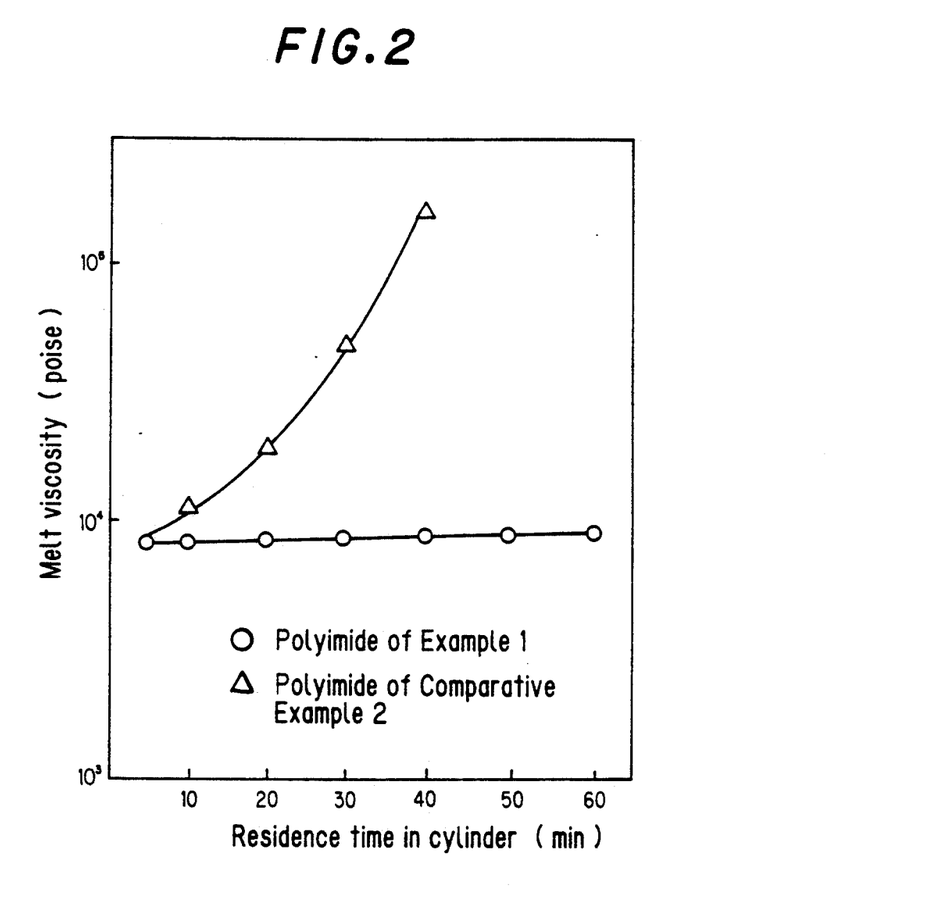
FIG. 2 illustrates results on processing stability obtained by changing residence time in the cylinder of a flow tester at 420° C. under 100 kg load on the polyimide powder obtained in Example 1 and Comparative Example 2.

The processing stability of the polyimide thus obtained was evaluated by measuring the melt viscosity when the residence time is changed at 420° C. under 100 kg load. The results are illustrated in FIG. 2. The melt viscosity was almost constant even though residence time is extended. Thus heat stability was good.

COMPARATIVE EXAMPLE 1

To the same reaction vessel as used in Example 1, 120.0 g (0.6 mole) of 3,4'-diaminodiphenylether, 125.57 g (0.576 mole) of pyromellitic dianhydride, 7.10 g (0.048 mole) of phthalic anhydride, 8.4 g of γ-picoline and 980 g of m-cresol were charged.

The same procedures as described in Example 1 were carried out to obtain 228.8 9 (99.0% yield) of polyimide powder.

The polyimide powder had no distinct glass transition temperature and exibited no melt flowability at all at 420° C.

COMPARATIVE EXAMPLE 2

Polyimide powder was prepared by carrying out the same procedures as described in Example 1 without using phthalic anhydride.

The polyimide powder had a glass transition temperature of 246° C. and an inherent viscosity of 0.60 dl/g. The melt viscosity was measured by changing the residence time in the cylinder of the flow tester as described in Example 1. As illustrated in FIG. 2, the melt viscosity was increased with extended residence time. Thus, the heat stability of the polyimide powder thus obtained was inferior to that of the polyimide obtained in Example 1.

EXAMPLE 2

To a reaction vessel equipped with a stirrer, reflux condenser, water separator and nitrogen inlet tube, 12.00 g (0.06 mole) of 3,3'-diaminodiphenyl ether, 17.02 g (0.0579 mole) of 3,3',4,4'-biphenyltetracarboxylic dianhydride, 0.622 g (4.2×10$^{-3}$ mole) of phthalic anhydride, 0.84 g of γ-picoline and 120 g of m-cresol were charged. The mixture was heated to 145° C. with stirring in a nitrogen atmosphere while distilling out about 2 cc of water and further reacted for 4 hours at 140° to 150° C. The reaction mixture was cooled to room temperature and poured into about 1000 cc of methyl ethyl ketone. The precipitate was filtered, washed with methyl ethyl ketone and dried at 180° C. for 24 hours under reduced pressure to obtain 27.07 g (98.5% yield) of polyimide powder.

The polyimide powder obtained had an inherent viscosity of 0.48 dl/g, glass transition temperature of 233° C., and 5% weight loss temperature of 548° C. in the air.

Figure 3:
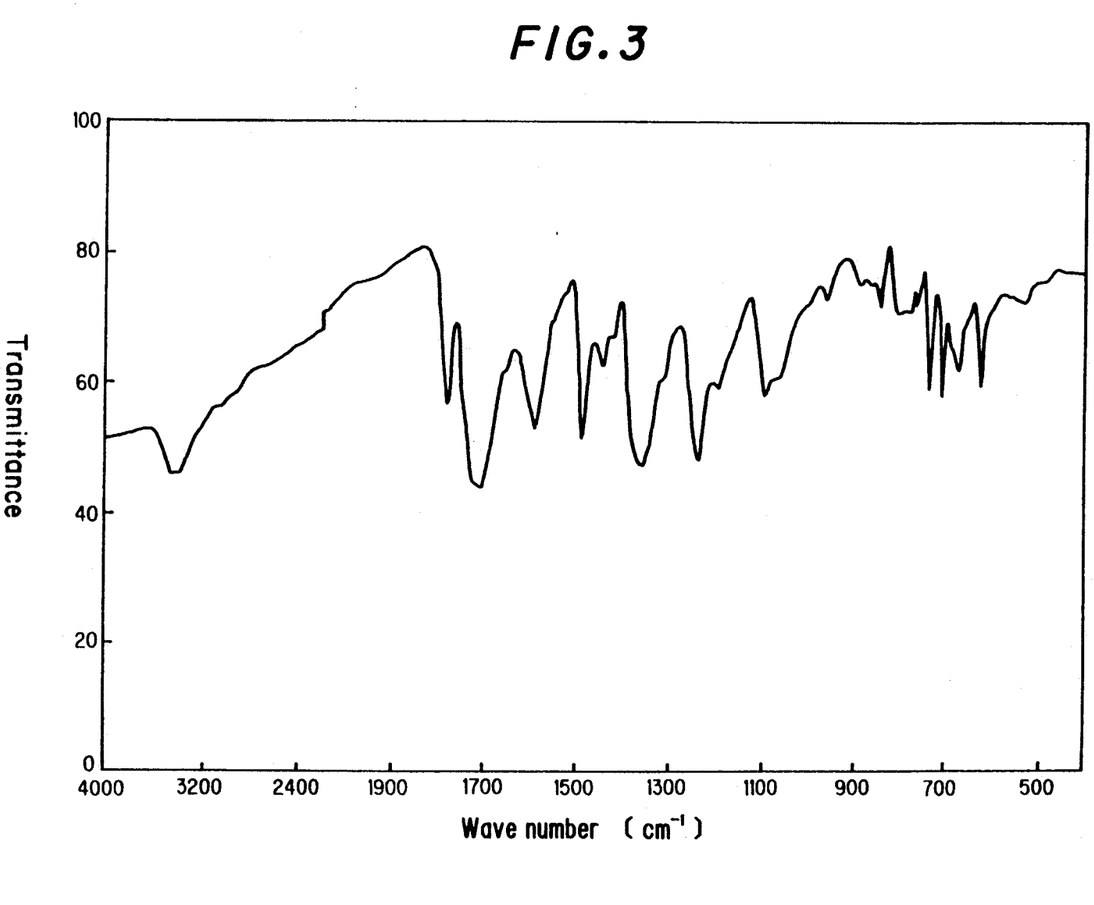
FIG. 3 and FIG. 4 illustrate drawings of infrared absorption spectra of polyimide powder obtained in Example 3 and Example 4.

The IR absorption spectrum of the polyimide powder is illustrated in FIG. 3. In the spectrum, characteristic absorption bands of imide near 1780 cm$^{-1}$ and 1720 cm$^{-1}$, and a characteristic absorption band of ether linkage near 1240 cm$^{-1}$ were clearly observed.

The following results were obtained by elemental analysis of the polyimide powder.

| | Elemental analysis | | |
|---|---|---|---|
| | C | N | H |
| Calculated (%) | 73.35 | 6.11 | 3.07 |
| Found (%) | 73.33 | 6.14 | 3.03 |

The polyimide had a melt viscosity of 6500 poise at 400° C. The strand obtained was light yellow and very flexible.

EXAMPLE 3

To the same reaction vessel as used in Example 1, 12.00 g (0.06 mole) of 3,4'-diaminodiphenyl ether and 118.6 g of N,N-dimethylacetamide were charged, and 17.47 g (0.0594 mole) of 3,3',4,4'-biphenyltetracarboxylic dianhydride was added by portions at room temperature in a nitrogen atmosphere with caution to prevent temperature rise of the solution. The resulting mixture was stirred for 20 hours at room temperatures and then 0.177 g ($1.2 \times 10^{-3}$ mole) of phthalic anhydride was added and further stirred for 3 hours. The polyamic acid thus obtained had an inherent viscosity of 1.06 dl/g.

The inherent viscosity of the polyamic acid was measured at 35° C. in a N,N-dimethylacetamide solution containing 0.5 g of the polyamic acid in 100 ml of the solvent.

A portion of the polyamic acid solution was cast on a glass plate and heated at 100° C., 200° C. and 250° C. for an hour, respectively, to obtain a polyimide film having a thickness of about 50 μm.

The polyimide film had a tensile strength of 16.1 kg/mm$^2$, tensile modulus of 340 kg/mm$^2$ and elongation of 5.7% in accordance with ASTM D-822.

EXAMPLE 4

The same procedures as described in Example 3 were carried out by using the same reaction vessel except that 3,4'-diaminodiphenyl ether is replaced by 3,3'-diaminodiphenyl ether. The polyamic acid solution thus obtained had an inherent viscosity of 0.84 dl/g.

The procedures described in Example 3 were repeated by using the polyamic acid thus obtained to prepare a polyimide film having a thickness of 50 μm.

The polyimide film had a total light transmittance of 80.0% and haze of 0.8% in accordance with ASTM D-1003.

COMPARATIVE EXAMPLE 3

Total light transmittance was measured on a marketed polyimide film, Kapton 200H (Trade mark of E. I. Du Pont de Nemours & Co.) by using the same procedures as described in Example 4.

Total light transmittance was 49.0% and haze as 1.3%.

EXAMPLE 5

The same procedures as described in Example 1 were carried out except that 3,4'-diaminodiphenyl ether is replaced by 4,4'-diaminodiphenyl ether.

The polyimide powder thus obtained had an inherent viscosity of 0.61 dl/g.

Figure 4:
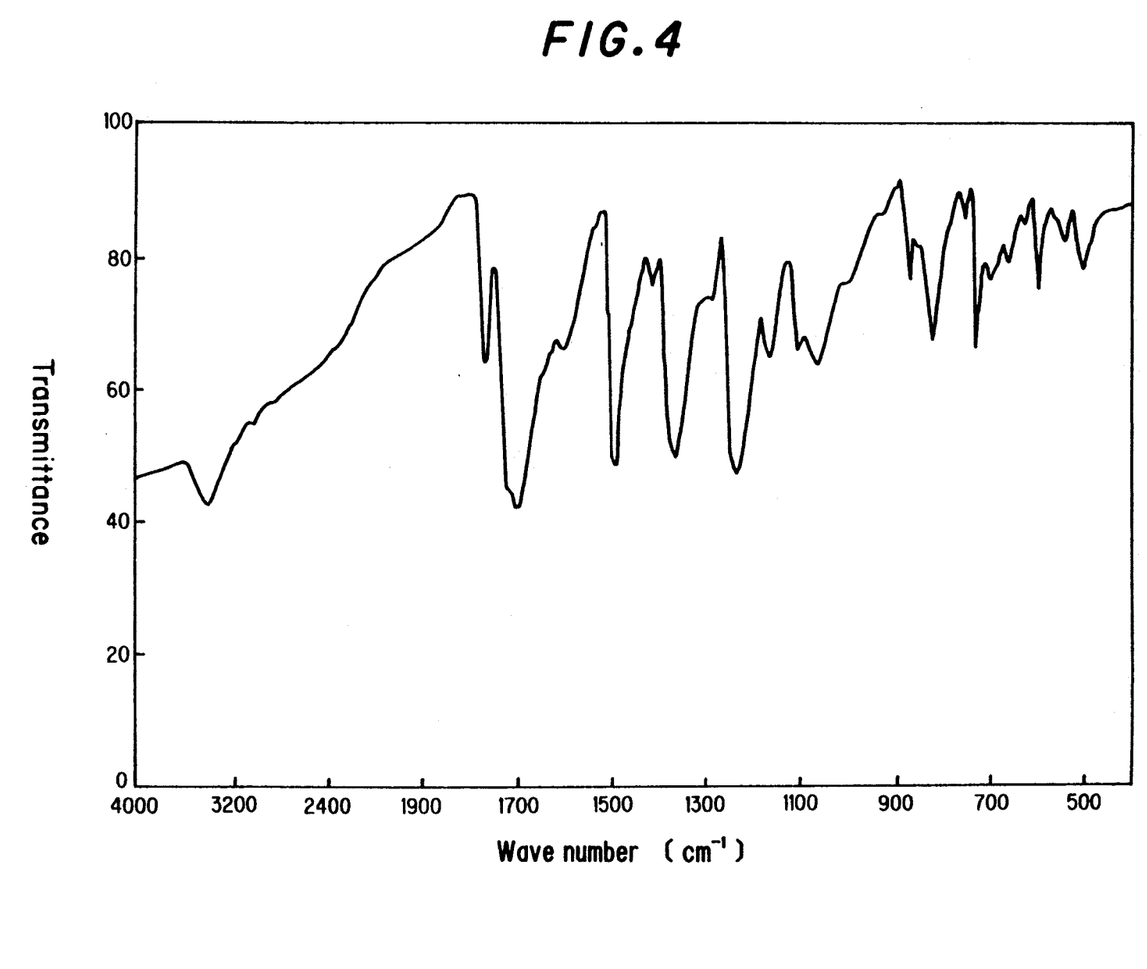

The infrared absorption spectrum of the polyimide powder is illustrated in FIG. 4.

In the spectrum, characteristic absorption bands of imide near 1780 cm$^{-1}$ and 1720 cm$^{-1}$, and a characteristic absorption band of ether linkage near 1240 cm$^{-1}$ were clearly observed.

Following results were obtained by the elemental analysis of the polyimide, powder.

| Elemental analysis | | | |
|---|---|---|---|
| | C | N | H |
| Calculated (%) | 73.35 | 6.11 | 3.07 |
| Found (%) | 73.30 | 6.09 | 3.05 |

The polyimide powder was insoluble in halogenated hydrocarbon solvents such as methylene chloride and chloroform.

What is claimed is:

1. A melt-processable polyimide comprising a polymer chain being blocked at the end with a divalent aromatic radical derived from phthalic anhydride having the formula (IV):

and essentially consisting of recurring structural units represented by the formula (I):

2. A process for preparing a readily processable polyimide comprising reacting diamine with tetracarboxylic dianhydride and thermally or chemically imidizing the resultant polyamic acid wherein

(1) the diamine is a diamino-diphenyl ether represented by the formula (II):

(2) the tetracarboxylic acid dianhydride is 3,3',4,4'-biphenyltetracarboxylic dianhydride having the formula (III):

(3) the reaction is carried out in the presence of phthalic anhydride having the formula (IV):

(IV)

(4) the phthalic anhydride of the formula (IV) is reacted in an amount of from 0.001 to 1.0 mol per mole of the diamine component of the formula (II).

3. The process of claim 2 wherein the diamine and the tetracarboxylic dianhydride are reacted and the phthalic anhydride is added to continue the reaction.

4. The process of claim 2 wherein the diamine and the phthalic anhydride area reacted and the tetracarboxylic dianhydride is added to continue the reaction.

5. The process of claim 2 wherein tetracarboxylic dianhydride, the diamine and the phthalic anhydride are added to a reaction vessel simultaneously.

* * * * *